(12) United States Patent
Ortiz et al.

(10) Patent No.: US 8,300,968 B2
(45) Date of Patent: Oct. 30, 2012

(54) METHOD AND SYSTEM FOR ENABLING REAL-TIME SPECKLE PROCESSING USING HARDWARE PLATFORMS

(75) Inventors: Fernando E. Ortiz, Newark, DE (US);
Eric Kelmelis, New London, PA (US);
James P. Durbano, Newark, DE (US);
Peterson F. Curt, Bear, DE (US)

(73) Assignee: EM Photonics, Inc., Newark, DE (US)

( * ) Notice: Subject to any disclaimer, the term of this patent is extended or adjusted under 35 U.S.C. 154(b) by 1321 days.

(21) Appl. No.: 11/875,298

(22) Filed: Oct. 19, 2007

(65) Prior Publication Data

US 2009/0103832 A1    Apr. 23, 2009

(51) Int. Cl.
G06K 9/40 (2006.01)
G06K 9/00 (2006.01)
G06K 9/46 (2006.01)
G06K 9/66 (2006.01)
G06K 9/36 (2006.01)

(52) U.S. Cl. ........ 382/254; 382/100; 382/191; 382/275; 382/280

(58) Field of Classification Search ................. 382/100, 382/191, 254, 275, 280
See application file for complete search history.

(56) References Cited

U.S. PATENT DOCUMENTS

| | | | |
|---|---|---|---|
| 4,913,549 A * | 4/1990 | Fujita et al. | 356/521 |
| 7,120,312 B2 | 10/2006 | George | |
| 7,139,067 B2 | 11/2006 | Pohle et al. | |
| 7,245,742 B2 | 7/2007 | Carrano et al. | |
| 7,303,280 B2 | 12/2007 | Olivier et al. | |
| 2006/0055772 A1 * | 3/2006 | Rosen | 348/31 |

OTHER PUBLICATIONS

Curt, P.—"Reconfigurable device for enhancement of long-range imagery"—Apr. 2007—SPIE vol. 6546; pp. 1-12.*
Humphrey, J.—"Reconfigurable Device for Real-Time Compensation of Atmospheric Effects in Long-Range Imaging"—2006 MAPLD International Conference; abstract only.*
"An exact, linear solution to the problem of imaging through turbulence," B.R. Frieden, Optical Sciences Center, University of Arizona, Tucson, AZ, Optics Communications 150 (1998) 15-21, May 1, 1998.
"Speckle Imaging over Horizontal Paths," C. J. Carrano, SPIE Conference on High-Resolution Wavefront Control, Conference in Seattle, WA, Jul. 8-9, 2002.

* cited by examiner

*Primary Examiner* — Bernard Krasnic
(74) *Attorney, Agent, or Firm* — Connolly Bove Lodge & Hutz LLP; Jeffrey W. Gluck

(57) ABSTRACT

An accelerator for the speckle atmospheric compensation algorithm may enable real-time speckle processing of video feeds that may enable the speckle algorithm to be applied in numerous real-time applications. The accelerator may be implemented in various forms, including hardware, software, and/or machine-readable media.

9 Claims, 13 Drawing Sheets

(SW Dataflow w/Sliding Window)

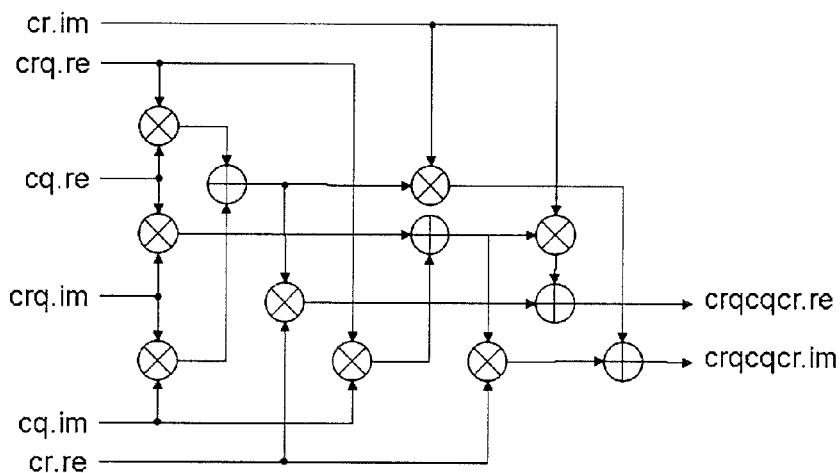
FIG. 3A (BCU)
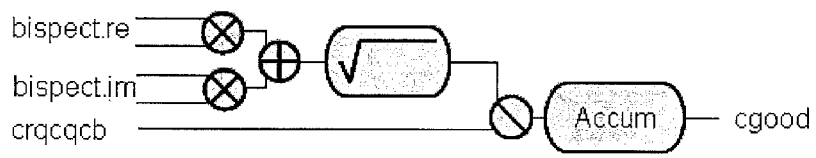
FIG. 3B (BNU)
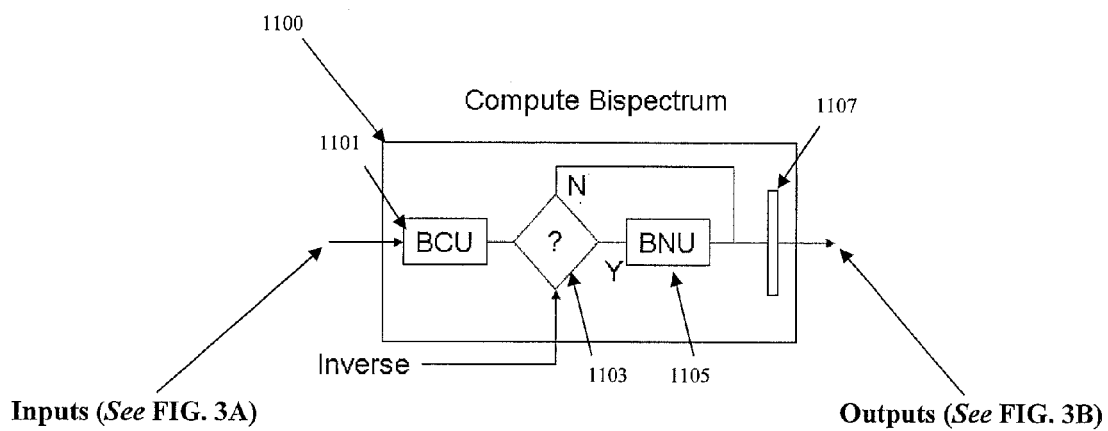
FIG. 4

(Background Art SW Dataflow)

(Re-partitioned SW Dataflow)

(SW Dataflow w/Sliding Window)

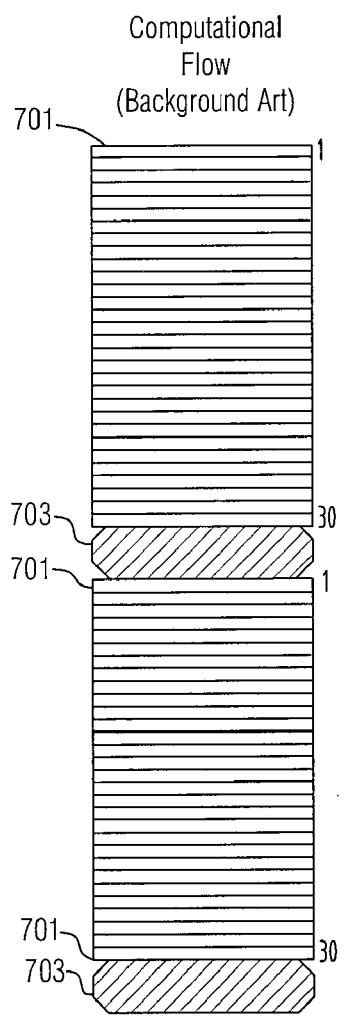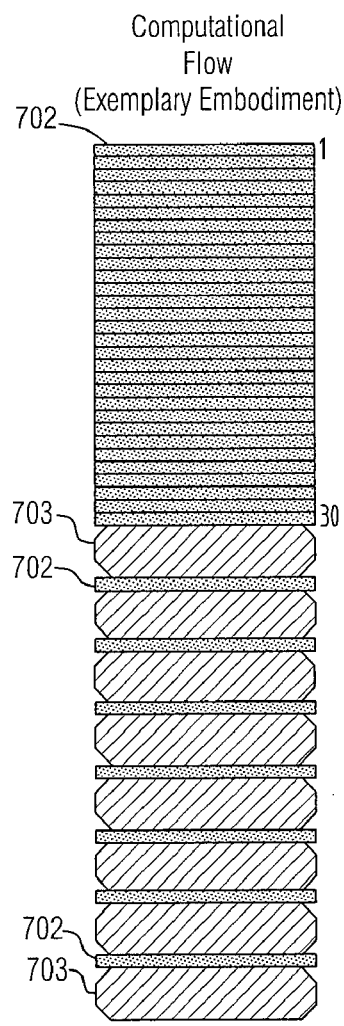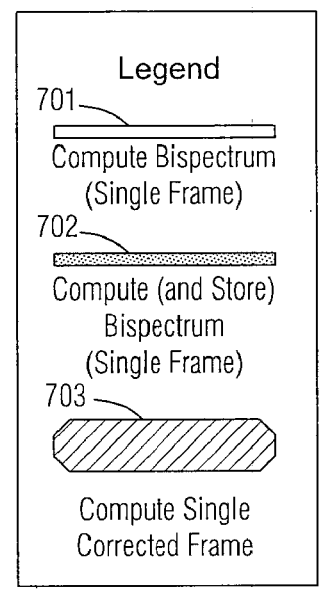
FIG. 6A    FIG. 6B

Input Connectors:
- Single Link SDI
- Component Betacam NTSC-J
- Composite NTSC
- Component SMPTE NTSC-J
- S-Video NTSC
- Composite PAL
- Component Betacam NTSC
- S-Video PAL
- Component SMPTE NTSC
- Component Betacam PAL
- Composite NTSC-J
- Component SMPTE PAL
- S-Video NTSC-J
- Component XVGA (High Definition only)

Supported resolutions and Framerates:

| | | |
|---|---|---|
| 720x576 @ 25.00i | 1280x720 @ 23.976p | 1920x1080 @ 23.976sF |
| 720x576 (Wide) @ 25.00i | 1280x720 @ 24.00p | 1920x1080 @ 24.00sF |
| 720x486 @ 29.97i | 1280x720 @ 29.97p | 1920x1080 @ 25.00sF |
| 720x480 @ 29.97i | 1280x720 @ 30.00p | 1920x1080 @ 29.97sF |
| 720x480 (Wide) @ 29.97i | 1280x720 @ 50.00p | 1920x1080 @ 30.00sF |
| | 1280x720 @ 59.94p | 1920x1080 @ 25.00i |
| | 1280x720 @ 60.00p | 1920x1080 @ 29.97i |
| | | 1920x1080 @ 30.00i |
| | | 1920x1080 @ 23.976p |
| | | 1920x1080 @ 24.00p |
| | | 1920x1080 @ 25.00p |
| | | 1920x1080 @ 29.97p |
| | | 1920x1080 @ 30.00p |

FIG. 8B

METHOD AND SYSTEM FOR ENABLING REAL-TIME SPECKLE PROCESSING USING HARDWARE PLATFORMS

This invention was made with Government support under Contract NNK06OM14C awarded by NASA. The Government has certain rights in this invention.

FIELD OF THE INVENTION

The field of the invention is optical image processing. In particular, the present invention relates to hardware and methods for efficient algorithms for large-aperture optical image processing.

BACKGROUND OF THE INVENTION

The quality of images taken with long-range optical imaging systems can be severely degraded by atmospheric movements, such as turbulence and air movement, in the path between the region under observation and the imaging system. In particular, as distance increases, atmospheric turbulence is often the dominating source of image degradation in infrared and visible imaging applications. Assuming ideal observation conditions, the minimum distinguishable feature size that can be resolved using a given optical imaging system is bounded by the diffraction limit ($1.22\lambda/D$), where $\lambda$ is the wavelength and D is the distance. This diffraction limit suggests that large-aperture optical imaging systems enable finer image features to be resolved/distinguished.

However, in large-aperture optical imaging systems, turbulence and air movement become the limiting factors long before the diffraction limit effects discussed above appear. In particular, the minimum distinguishable feature under turbulent conditions is given by the equation $1.22\lambda/R0$, where $R0$ may be as small as a few centimeters and may be dependent on the strength of the turbulence and air movement. Thus, there is a practical limit on the ability to image distant objects in background art large-aperture optical imaging systems. Due to this, large-aperture optical imaging systems of the background art systems: (1) have not been able to take full advantage of the potential for increased resolution suggested by the diffraction limit; and (2) do not provide improvements in resolution and feature separation characteristics over smaller-aperture optical imaging systems.

For example, a very similar problem is faced by astronomers when trying to image the sky through the turbulent atmosphere of the earth using large telescopes. To overcome this limitation, special signal processing algorithms were developed that are capable of minimizing the effects of a turbulent atmospheric path by combining information from several images taken in a time sequence. A bispectral speckle imaging method described by C. J. Carrano, in "Speckle imaging over horizontal paths," was presented at High Resolution Wavefront Control: Methods, Devices, and Applications IV, 2002. Unlike astronomical optical imaging, the challenges in large-aperture optical imaging systems for horizontal or slanted atmospheric paths are that the scenes are extended and the scene covers a very large visible angle. Thus, in general, the small-angle approximations typically used in astronomical applications cannot be directly applied to slanted path imaging systems.

In addition, the background art includes other digital signal processing techniques that have been applied to degraded images in an attempt to correct the images to overcome atmospheric turbulence. In an article by B. R. Frieden, entitled: "An exact, linear solution to the problem of imaging through turbulence," Opt. Comm. 150 (1998) 15, a sequence of two short-exposure intensity images is taken without any reference point sources. The images are then Fourier transformed and divided by linear equations based on two random point spread functions. The result is then inverse filtered to provide an image of an object. However, a problem with this method is that the point spread functions associated with the turbulence are not known in an image due to the lack of any reference. This situation can cause further problems in recovering an image taken through turbulence. Other examples of background art in this technology area include, but are not limited to: U.S. Pat. No. 7,139,067S (Pohle et al.); U.S. Pat. No. 7,120,312 (George); U.S. patent application Ser. No. 10/661,138; U.S. patent application Ser. No. 11/017,384 (Olivier et al) and U.S. patent application Ser. No. 10/610,152 (Carrano et al).

As another example of the above-discussed background art (i.e., Carrano et al.), researchers at Lawrence Livermore National Laboratories have refined the astronomical bispectral speckle imaging methods and modified them for earth-based use. FIG. 1 is an exemplary block diagram 100 of this background art method. The method combines information from several images, taken a short time apart from one another. These can be a series of multiple short-exposure still shots from a conventional camera or, more commonly, a sequence of consecutive video frames. This information is combined and processed by complex "averaging" procedures in the frequency domain, where the magnitude and phase are calculated independently and subsequently recombined in the real space. However, on a personal computer (PC), this method requires several seconds to analyze a single frame. Thus, even though this bispectral method provides accurate results, it must be accelerated in order to work in real time.

To accommodate the spatially varying point spread functions experienced in earth-bound imaging, overlapping sub-fields of the image are separately speckle processed and re-assembled to form the full field of an the image. As shown in FIG. 2A and FIG. 2B, what results is a method that produces a single corrected image with quality near the diffraction limit. In FIG. 2A, the image frame represents original, degraded video image frame captures. FIG. 2B is the effect on the image frame after running the speckle imaging method on the degraded images. The computational rate required is a direct consequence of the large number of pixels in the image, which must be transformed into the frequency domain (e.g., by the Fast Fourier Transform (FFT)) and then to the bispectral domain. These transformations account for the majority of the computational time in the execution of the speckle algorithm.

If the above-discussed problems of the background art could be overcome, numerous applications could benefit from improvements in large-aperture, optical imaging. Most obvious are applications are the military field, particularly intelligence, reconnaissance, and target designation. Moreover, there are many civilian applications of this technology as well, especially in the surveillance and homeland security areas. Unfortunately, these atmospheric compensation algorithms are very computationally intensive, which prevents even top-of-the-line PCs from evaluating them in real time. The necessary processing typically requires tens of seconds to enhance a single frame. In addition, this duration of time for processing problem is worsened when video feeds are to be processed, since real-time video requires several dozen frames per second (e.g., a two order-of-magnitude difference). Therefore, there is a need in the art for improved computational methods and systems for large-aperture optical imaging systems that would allow real-time or increased performance.

SUMMARY OF THE INVENTION

Embodiments of the invention enable real-time speckle processing of video feeds that further enables the speckle algorithm to be applied in numerous real-time applications. Features and advantages of embodiments of the invention will become apparent from the following description. A broad representation of the invention is provided by the detailed description, which includes, but is not limited to: discussion, drawings and examples of specific embodiments. Various changes and modifications within the spirit and scope of the invention will become apparent to those skilled in the art from this description and by practice of the invention.

Exemplary embodiments of the invention include hardware, software and machine readable mediums for an accelerator for the Speckle atmospheric compensation algorithm. In particular, one embodiment of the invention is a method for fast computation of a Speckle Algorithm, comprising: initializing and setting up a plurality of memory locations; setting a frame counter to 0; inputting a present frame of a time sequenced image; computing a bispectrum of the present frame; adding the present bispectrum computation to previously accumulated bispectrum computations and storing in one of the plurality of memory locations; incrementing the frame counter; checking whether the frame counter equals the number of frames to be processed; incrementing the frame counter when the frame counter is less than the number of frames to be processed and returning to the step of inputting the present frame; setting the frame counter to zero when the frame counter is equal to the number of frames to be processed and computing the normalization of the accumulated bispectrum computations; computing an inverse bispectrum computation; outputting the inverse bispectrum and returning to the step of inputting the present frame.

Another embodiment of the invention is a method for real-time computation of a Speckle algorithm incorporating a sliding window, comprising: initializing and setting up a plurality of memory locations; setting a frame counter to zero; inputting a present frame of a time sequenced image; computing the bispectrum of the present frame; determining whether the computed bispectrum buffer is full with accumulated bispectrum computations: when the computed bispectrum buffer is not full, setting a next oldest computed bispectrum frame to an oldest computed bispectrum frame, adding the computed bispectrum of the present frame to the previous accumulated bispectrum frame computations and, if the computed bispectrum buffer is still not full, incrementing the frame counter and return to the step of inputting the present frame; and when the computed bispectrum buffer is full, subtracting a next oldest computed bispectrum frame from the accumulated bispectrum frame computations, setting a next oldest computed bispectrum frame to an oldest computed bispectrum frame, adding the computed bispectrum of the present frame to the previous accumulated bispectrum frame computations and, if the buffer is still not full, incrementing the frame counter and return to the step of inputting the present frame; and when the computed bispectrum buffer is full, normalizing the accumulated computed bispectrums; inverting the normalized accumulated bispectrums; outputting the normalized accumulated inverted bispectrums; incrementing the frame counter and returning to the step of inputting the present frame.

Yet another embodiment of the invention is a system for real-time computation of a method for a Speckle algorithm, as recited in either of the above embodiments and further comprising: a host computer; a PCI bridge; an oscillator; a transmitter synthesizer; a serialilzer; a receiver; SRAM and DRAM memory modules; and an FPGA.

Preferably, the embodiments of the system above, further comprises: input and output shielded connectors configured to input and output video data; an equalizer and cable driver connecter to the input and output shielded connectors, respectively; and the deserializer and serializer are connected to the outputs the equalizer and cable driver, respectively.

Preferably, in the system of the embodiment above, the FPGA further comprises: a framing receiver and framing transmitter connected to the outputs form the deserializer and serializer, respectively; and a decoder and encoder connected to the outputs from the framing receiver and framing transmitter, respectively, and an SDRAM and the PCI Bridge are connected to the FPGA, wherein the deserializer is connected to the framing receiver and the serialize is connected to the framing transmitter.

Preferably, in the system of embodiment above, the FPGA comprises a Speckle engine, and the Speckle engine further comprises: a startup function and parameter register file configured to control system operation; an extract tile function connected to a Demean function and configured to provide inputs to an Apodization window; a first two-dimensional (2-D) Real-Complex FFT connected to the outputs of the Apodization window; an Intensity function connected to the 2-D Real-Complex FFT; a Compute Bispectrum function connected to outputs of the Intensity function; an Averaging Unit connected to outputs of the Compute Bispectrum function; a second two-dimensional (2-D) Real-Complex FFT connected to outputs of the Averaging Unit; and an Apodization Gain unit connected to outputs of the second two-dimensional (2-D) Real-Complex FFT; wherein the startup function is connected to the parameter register file, and the Speckle engine, the PCI bridge is connected to the startup function and the SDRAM is connected to the Speckle engine.

BRIEF DESCRIPTION OF THE DRAWINGS

Embodiments of the invention can be described in greater detail with the aid of the following drawings.

FIG. 3A is an exemplary block diagram of an embodiment of a Bispectrum Computation Unit (BCU).

FIG. 3B is an exemplary block diagram of an embodiment of a Bispectrum Normalization Unit (BNU).

FIG. 4 is an exemplary block diagram combining the BCU and BNU to form the Compute Bispectrum function.

FIG. 6A is an exemplary computational flow diagram for the Speckle algorithm of the background art.

FIG. 6B is an exemplary computational flow diagram for the re-partitioned and accelerated Speckle Algorithm.

FIG. 8B shows a parts list for an exemplary Accelerated Speckle Demonstration System, as shown in FIG. 8A.

DETAILED DESCRIPTION OF THE PREFERRED EMBODIMENTS

Generally speaking, three major computational bottlenecks have prevented real-time processing capabilities from being applied to the speckle algorithm. These bottlenecks are: (1) the Fast Fourier Transforms (FFTs); (2) calculation of the bispectrum; and (3) normalization of the bispectrum. Since they are a computational component of many scientific and image processing algorithms, extensive work has been done on the acceleration of FFTs. However, despite these efforts and despite computing the algorithm with accelerated FFT cores, the speckle algorithm would still be too slow to be of practical use. Thus, embodiments of the speckle algorithm in the invention include two methods: accelerating the calculation of the bispectrum; and accelerating normalization of the bispectrum. To implement these two methods, embodiments of the invention include two hardware accelerator units: (1) a Bispectrum Computation Unit (BCU); and (2) a Bispectrum Normalization Unit (BNU). Moreover, a third manner of accelerating the speckle algorithm in embodiments of the invention is a non-obvious reformulation of the speckle algorithm itself. The following paragraphs will further detail the above-discussed embodiments of the invention.

Figure 1:
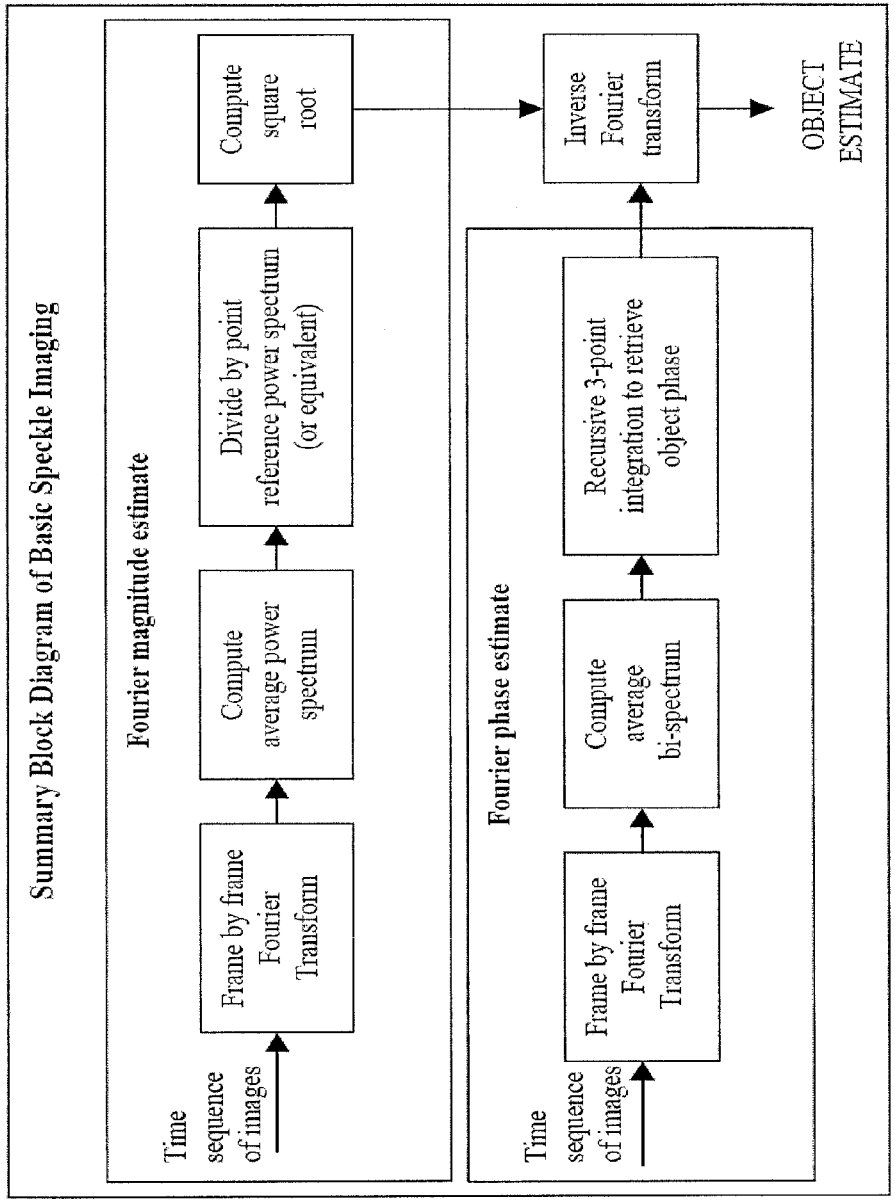
FIG. 1 is an exemplary block diagram of a background art Speckle Imaging Method.
Figure 2A:
FIG. 2A, the image frame represents original, degraded video image frame captures.
Figure 2B:
FIG. 2B is the effect on the image frame after running the speckle imaging method on the degraded images.

The Bispectrum Computation Unit (BCU) is a part of the portion of the speckle algorithm that computes an "Average Power Spectrum" stage of the speckle algorithm flow diagram 100 (e.g., see FIG. 1). A rapid calculation of the bispectrum is at the core of accelerating the speckle algorithm and is a major contributor to providing a real-time implementation of the speckle algorithm. In particular, the BCU helps convert data from the frequency domain into the bispectrum domain. The mathematical details of this conversion process can be found, for example in: "Speckle Imaging of Satellites at the Air Force Maui Station" by T. W Lawrence, D. M Goodman, E. M Johansson, J. P Fitch, which was presented at the European Southern Observatory (ESO) Conference on High Resolution Imaging By Interferometry II, Garching, Fed. Republic of Germany, 14-18 Oct. 1991.

Novel embodiments of the invention provide a method and system capable of performing the bispectrum computations in hardware, with significant speed gains is possible. In particular, FIG. 3A is more than a simple mapping of an algorithm from software to hardware, and instead the BCU represents a new way of computing the bispectrum results. It is analogous to the "butterfly" used in FFT computations that enables efficient implementation of the FFT core operations; the BCU represents a core capability that provides a repeatable computational unit that yields speed improvements in the implementation of the speckle algorithm.

In particular, the BCU of this embodiment of the invention takes several inputs (i.e., see the left side of FIG. 3A), representing various intermediate calculations internal to the bispectrum computation process. Each of these inputs consists of both a real and imaginary portion and is passed into our BCU. In implementations of the BCU, the operations indicated in FIG. 3A must be performed multiple times on each pixel. This would pose a tremendous computational burden on standard microprocessor implementations. In order alleviate this computational burden, embodiments of the invention utilize a custom hardware processor that is completely pipelined (i.e., one result per cycle) and further comprises several computational pipelines that can be implemented in a single FPGA or other hardware platforms such as, but not limited to: graphical processing units (GPUs) multi-core processors, Single-Instruction-Multiple Data (SIMD) digital signal processors (DSPs), Physics acceleration engines and custom floating-point acceleration cards.

The BCU of FIG. 3A carries out the bulk of the frequency-to-bispectrum domain conversion, ultimately producing another complex intermediate result having real (crqcqcr.re) and imaginary (crqcqcr.im) parts. From these complex intermediate results, crqcqcr, the actual bispectrum used by the speckle algorithm is generated. Since intermediate operations must be performed multiple times on each pixel, and each one can take several hundred cycles to complete, standard microprocessor implementations are unable to compute these results in real time. To alleviate this burden, embodiments of the invention utilize custom hardware processor that is completely pipelined (i.e., one result per cycle) and several of these computational pipelines can be implemented in a single FPGA or other hardware platforms (e.g., graphics processing units). In this manner, embodiments of the invention exploit the computational parallelism inherent to the algorithm and thus, accelerate the bispectrum computations and enable real-time speckle processing.

This section further discusses the Bispectrum Normalization Unit (BNU), as shown in FIG. 3B. Once the bispectrum has been computed by the BCU, the next step in the speckle algorithm process is the normalization of these bispectrum results against a reference power spectrum. As with the bispectrum computation, this normalization step is computationally intense, as it involves the addition and multiplication of complex numbers, square roots and division operations, as well as accumulation of these results. That is, though the elements of the bispectrum normalization functions of addition, multiplication, division are themselves, mathematically simple, the overall algorithm is a computationally intense process that represents a tremendous bottleneck in the speckle process.

To increase the performance of the speckle algorithm, embodiments of the invention include both a BCU and BNU in a Compute Bispectrum function block 1100, as shown in FIG. 4. In FIG. 4, The BNU 1105 receives inputs and implements the intense computations (i.e., see FIG. 3A) required by the normalization process as inputs to the custom hardware of the Compute Bispectrum block 1100. A Decision Function 1103 determines whether the Compute Bispectrum block 1100 makes a calculation of the forward or inverse bispectrum. In the case of an inverse bispectrum, the outputs of the BCU 1101 are fed as inputs to the BNU 1105, as shown in FIG. 4. In the case of a forward bispectrum calculation, the outputs of the BCU 1103 bypass the BNU 1105. In either case, the outputs are stored in an output register 1107 for later use. As with the BCU 1101, the BNU 1105 is pipelined and several can be placed in parallel to further enhance the performance of the system. As shown in FIG. 3B, the inputs to the BNU (bispect.re, bispect.im, crqcqb) are input from the left and are the real and imaginary components of the previously computed bispectrum. The reference spectrum (crqcqb) is input as well in order to provide values to normalize results against. In particular, the bispectrum works on the FFT of a tile that is an Apodization windowed portion of a demeaned, stabilized real image. Example windowing functions include, but are not limited to: Hanning, Hann, Hamming, Bartlett, Kaiser, Nutall, Blackman, Gauss and Flat top windows. After accumulation of the results, the normalized spectrum (cgood) is output from the BNU 1105 through the output pipeline register 1107.

The third aspect of accelerating the speckle algorithm is a non-obvious reformulation of the algorithm that is discussed in this section. In order to successfully accelerate algorithms, it is frequently necessary to change the underlying algorithms so that the algorithm is better structured for a desired hardware platform, rather than a standard microprocessor-based system. The reformulation for embodiments of the invention consists of two novel components: (1) a code partitioning scheme; and (2) a sliding window. These two components will be discussed further in the following paragraphs.

Microprocessors are general-purpose computational platforms that can easily, though perhaps inefficiently, implement diverse computational components. In contrast to microprocessors, hardware accelerators generally operate on "similar" computations in order to achieve a significant acceleration, such as the one obtained by embodiments of the invention. For example, graphics processing units (GPUs) are single-instruction, multiple-data (SIMD) computational engines that work most efficiently when processing data in parallel. Similarly, field-programmable gate arrays (FPGAs), allow multiple parallel computational data paths in order to increase computational performance. Thus, neither of these platforms is very efficient when operating on the diverse computational components of the structure of the original speckle algorithm. Reformulating the speckle algorithm will allow the process to be better matched to the strengths of accelerated hardware discussed above.

The speckle algorithm was originally designed to run on a microprocessor-based systems and thus, functioned as a single program to perform all aspects of the algorithm. However, when transitioning the algorithm to a pipelined hardware accelerated platform of embodiments of the invention, separating the functionality of the original speckle algorithm was developed. That is, the reformulation of embodiments of the invention has modified the original speckle algorithm to logically create two components: (1) setup; and (2) solve. Each of these components can be loaded onto a hardware acceleration platform of embodiments of the invention individually in order to obtain the best computational performance from the reformulation processing system. In this way, the entire hardware platform of embodiments of the invention can be "dedicated" to the computation of a given type of code section (e.g., BCU, BNU, Reformulation), rather than inefficiently utilizing the hardware of a standard microprocessor to solve diverse computations.

Figure 5A:
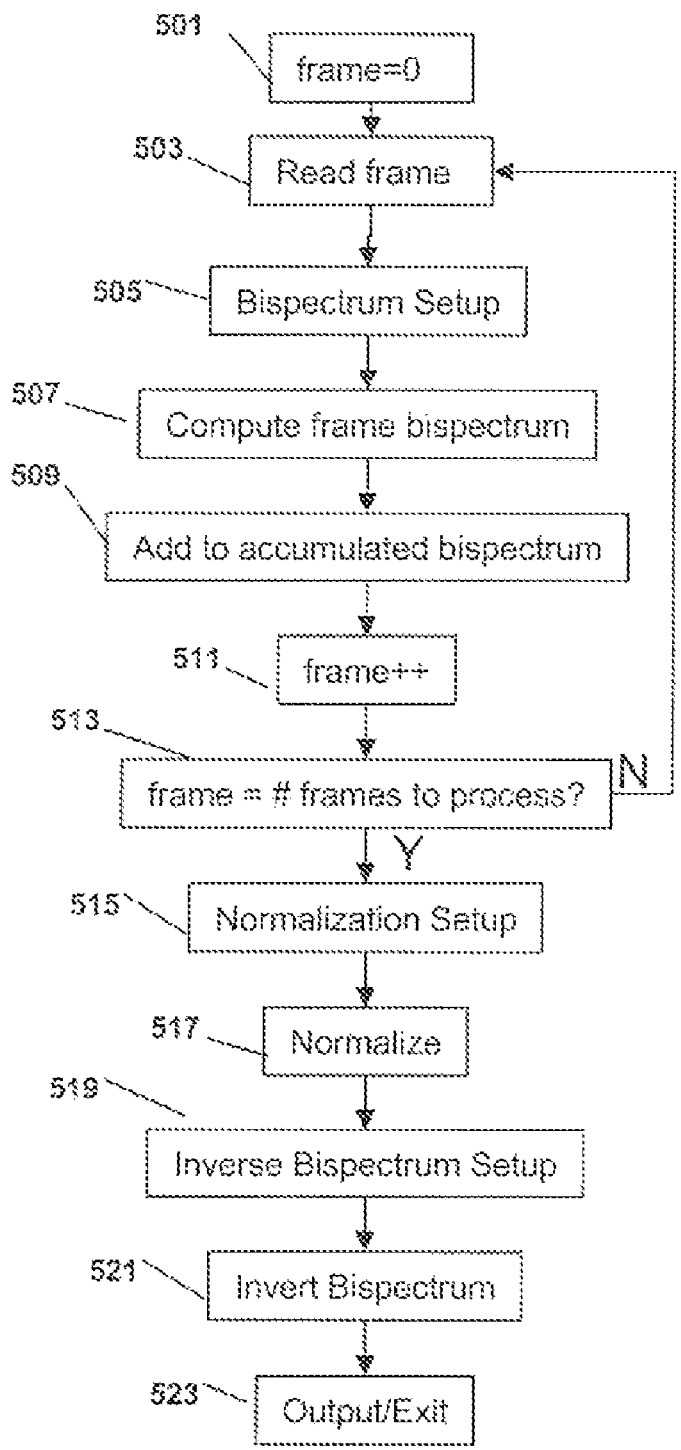
FIG. 5A is an exemplary flow chart of the Speckle Algorithm of the background art.

FIG. 5A is an exemplary flow chart representing the software code structure of the original speckle algorithm. In step 501 of FIG. 5A, the frame counter is set to 0. A frame of a time sequenced image is read in step 503. Setting up the bispectrum data in preparation for computation occurs in step 505. In step 507, the bispectrum of the frame is computed. Step 509 involves adding the computed bispectrum to accumulated bispectrums. The frame counter is incremented in step 511. Checking whether the frame counter equals the number of frames to be processed occurs in step 513. While the frame counter is less than the number of frames to be processed, steps 503 to 513 are repeated.

Alternatively, as shown in FIG. 5A, when step 513 determines the frame counter equals the number of frames to be processed, the accumulated bispectrum data is set-up for a normalization process in step 515. Step 517 computes the normalization of the accumulated bispectrum data. In step 519, the normalized data is set-up for the calculation of an inverse bispectrum. The inverse bispectrum is computed in step 521 and the Output of the inverse bispectrum occurs in step 523.

Figure 5B:
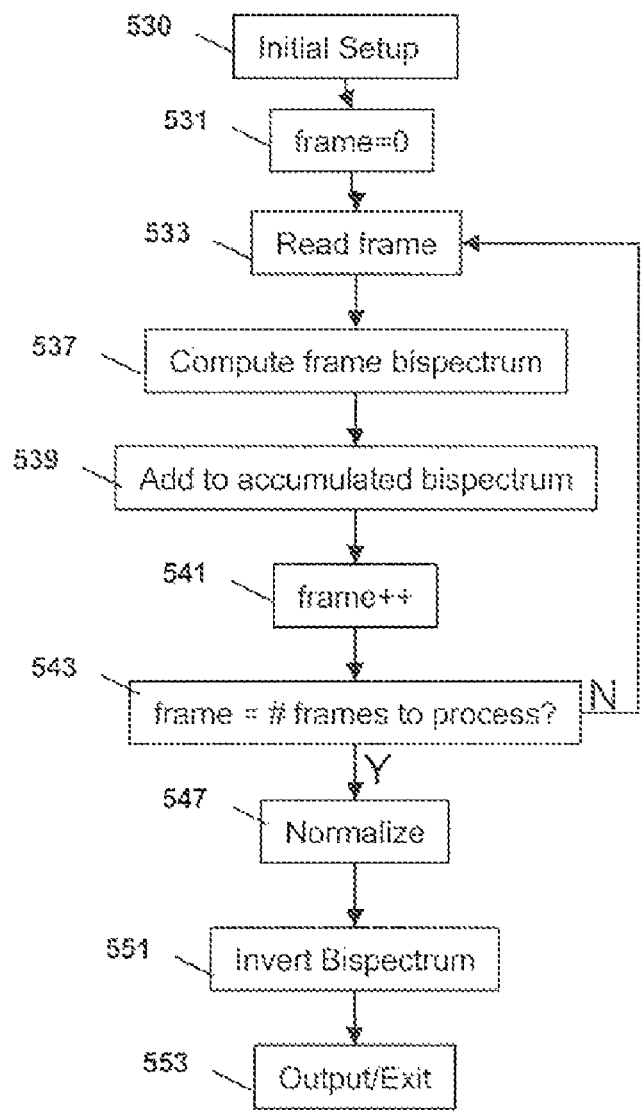
FIG. 5B is an exemplary flow chart of the re-partitioned and accelerated Speckle Algorithm of an embodiment of the invention.

FIG. 5B is an exemplary software flow chart representing the repartitioned flow diagram for the hardware-optimized code structure of embodiments of the invention. In particular, Step 530 consolidates the various set-up operations of the original Speckle algorithm (e.g., steps 505, 515 and 519, as discussed above) into a single block. This code structure enables embodiments of the invention to implement a more efficient hardware device architecture for replication of devices and increased processing speed for the algorithm. In addition, the computations for the inverse bispectrum are made more efficient in a similar way to that discussed above for the forward bispectrum. That is, several of the inner loop operations are put into hardware so that they may execute in a single cycle.

In step 531 of FIG. 5B, the frame counter is set to 0. A frame of a time sequenced image is read into the algorithm in step 533. In step 537, the bispectrum of the frame is computed. Step 539 involves adding the present computation bispectrum to previously accumulated bispectrum computations. The frame counter is incremented in step 541. Checking whether the frame counter equals the number of frames to be processed occurs in step 543. When the frame counter is less than the number of frames to be processed, steps 533 to 543 are repeated.

Alternatively, as shown in FIG. 5B, when the frame counter equals the number of frames to be processed, Step 547 computes the normalization of the accumulated bispectrum data. The inverse bispectrum is computed in step 551 and output of the inverse bispectrum occurs in step 553.

Figure 5C:
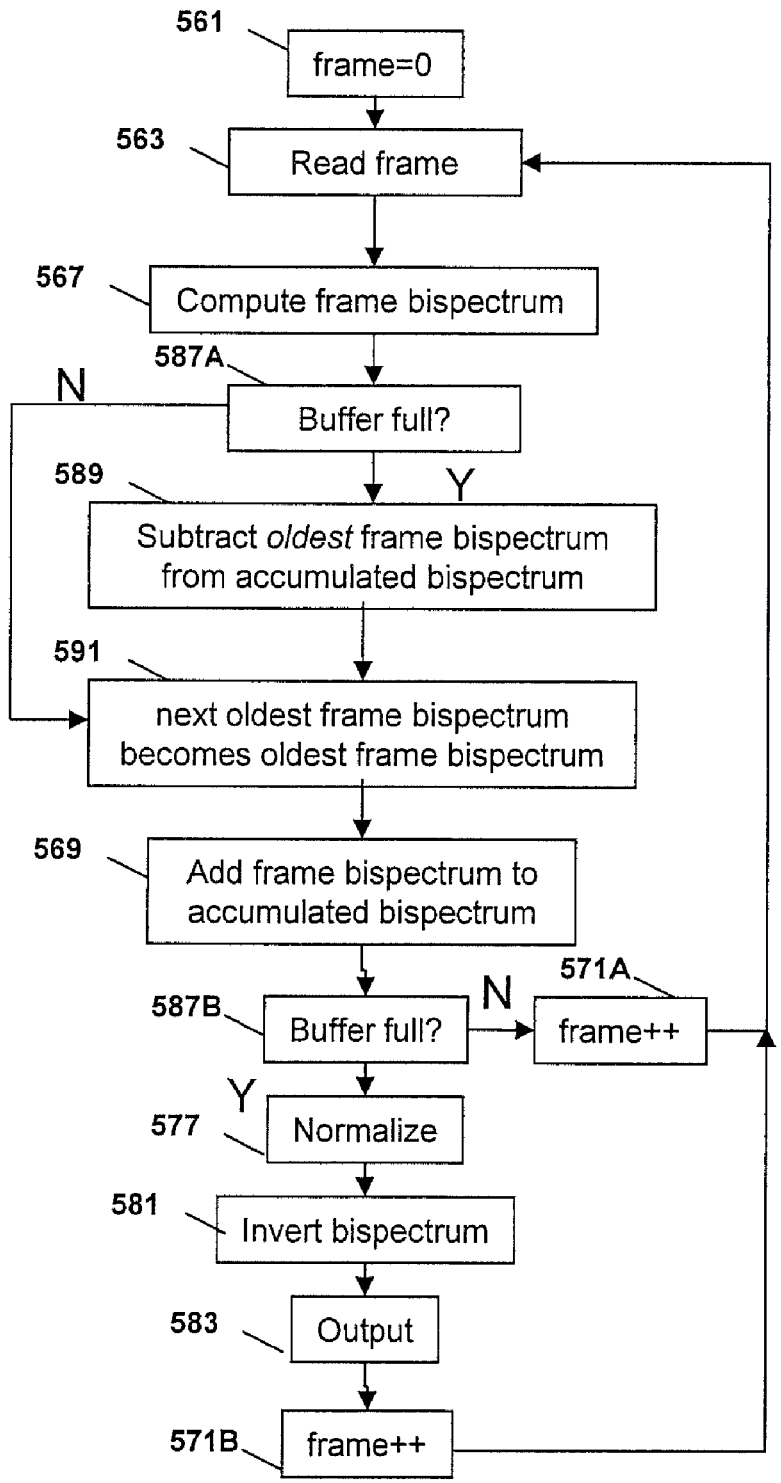
FIG. 5C is an exemplary flow chart of the re-partitioned and accelerated Speckle Algorithm after an embodiment of the invention after adding a Sliding Window.

The Sliding Window aspect of embodiments of the invention is further discussed in the following paragraphs. In particular, the second aspect of the repartitioned Speckle algorithm was the creation of a sliding window for bispectrum storage. FIG. 5C is an exemplary flow chart of the repartitioned Speckle Algorithm after adding a Sliding Window in a hardware implementation. In step 561 of FIG. 5C, the frame counter is set to 0. A frame of a time sequenced image is read in step 563. In step 567, the bispectrum of the frame is computed. Determining whether the computed bispectrum buffer is full with 30 accumulated bispectrum computations occurs in step 587A.

When the buffer is NOT full in step 587A, in step 591, the next oldest becomes the oldest computed bispectrum frame and step 569 adds the next computed bispectrum to the previous accumulated bispectrum computations and then proceeds to step 587B to determine whether the buffer is now full. In step 587B, when the buffer is not full, the frame counter is incremented in step 571A and the method returns to step 563.

Alternatively, when the buffer is full in step 587A, step 589 subtracts the oldest computed bispectrum frame of the accumulated bispectrum computations from the previous 30 accumulated bispectrum computations to produce 29 previous accumulated bispectrum computations. Step 569 adds the next computed bispectrum to the previous 29 accumulated bispectrum computations to provide the next 30 accumulated bispectrum computations and, in step 591, the next oldest becomes the oldest computed bispectrum frame. The flow then proceeds to step 587B to determine whether the buffer is now full (i.e., 30 accumulated bispectrum computations).

In step 587B, when the buffer is full, the 30 accumulated bispectrums are normalized in step 577. Next, the bispectrum is inverted in step 581. Step 583 outputs the inverted spectrum and step 571B increments the frame counter and the method returns to step 563.

FIG. 6A shows the computational flow of the original Speckle algorithm of the background art. As shown in FIG. 6A, the bispectrum frame computation 701 is performed 30 times for 30 consecutive frames in order to compute/process a first single corrected frame 703. This process of producing bispectrum frame computations 701 is repeated again and again for a next set of 30 consecutive frames before a next single corrected frame 703 is computed. For example, in the original Speckle algorithm, 1800 bispectrum frame computations were required to generate 1 second of enhanced video (i.e., 30 bispectrums/frame×60 frames/sec×1 sec).

FIG. 6B is a computational flow diagram of the improved, repartitioned Speckle algorithm implemented by the embodiments of the invention. As shown in FIG. 6B, a compute (and store) bispectrum computation 702 is performed for an initial 30 bispectrums. Then a single corrected frame 703 is computed. However, as shown in FIG. 6B, in the repartitioned Speckle algorithm of embodiments of the invention, only 1 additional compute (and store) bispectrum operation 702 provides a next single corrected frame 703 after the compute (and store) bispectrum operation 703 of the initial 30 compute (and) store bispectrum operations 702. Thus, as can be seen from FIG. 6B, embodiments of the invention achieve a speed-up, in terms of computing the corrected frame 703 in comparison with the background art Speckle algorithm, by storing the previous 30 bispectrum computations in memory. Therefore, for each new frame, embodiments of the invention compute and store a next bispectrum 702 and use the previously 29 computed bispectrums. In this manner, a single next bispectrum 702 is computed for each single corrected frame 703 and a speed-up in producing the corrected frames 703 is provided by embodiments of the invention.

This speed-up in the production of single corrected frames 703 also comes with a large-scale reduction in bispectrum computations per single corrected frame that dramatically reduces the overall computations and increases the performance of the repartitioned Speckle algorithm in comparison to the original Speckle algorithm of the background art. This will be further demonstrated through the performance testing of a prototype system discussed below and by considering our previous example. That is, for embodiments of the invention, the computational rate for real-time processing of 1 second of video uses 60 bispectrum transformations (i.e., 1 bispectrum/frame×60 frames/sec×1 sec) and only 60 bispectrum computations are utilized by the repartitioned Speckle algorithm as opposed to 1800 bispectrum computations (i.e., a factor of 30 speed up) for the original Speckle algorithm of the background art.

As discussed above, such a computational rate would not be possible on a standard microprocessor-based system because of the additional memory required for such an approach would be prohibitive in standard microprocessor architectures and configurations. In addition, such an optimization of the original Speckle algorithm is non-intuitive, non-obvious and an unexpected result since the architecture and configuration of this new design for the memory architecture would be incompatible with the memory architecture of standard microprocessor-based systems and PCs.

Figure 7A:
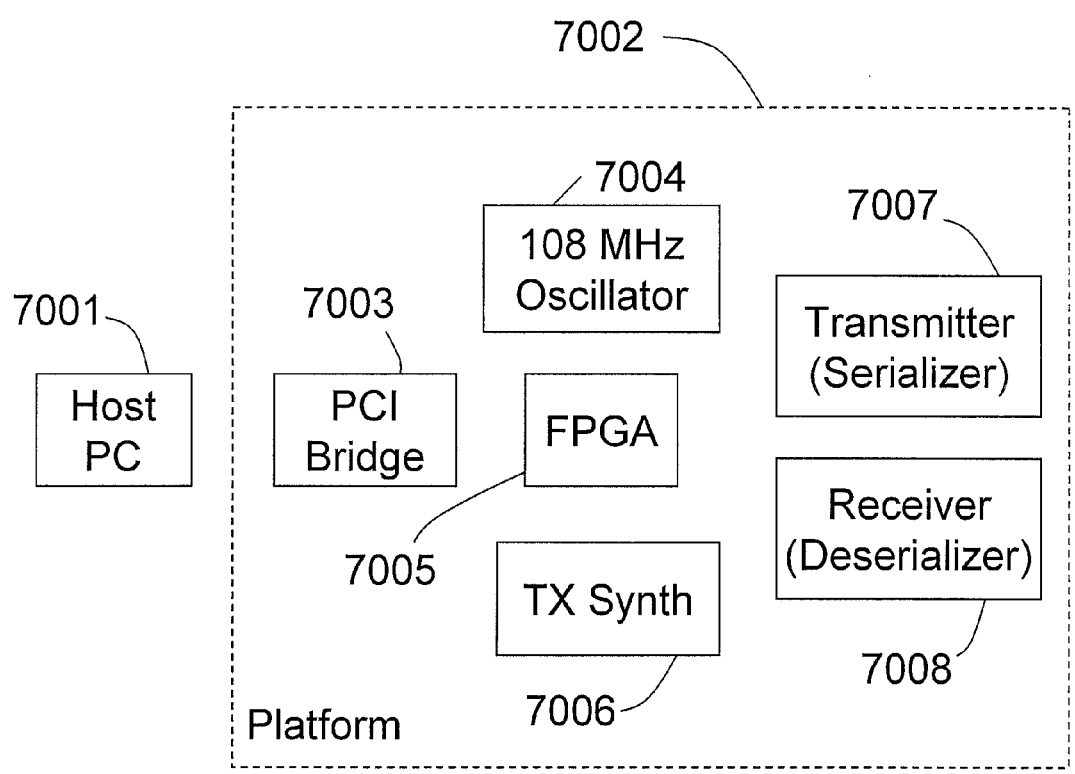
FIG. 7A is an exemplary board layout of the re-partitioned and accelerated Speckle Algorithm Demonstration.
Figure 7B:
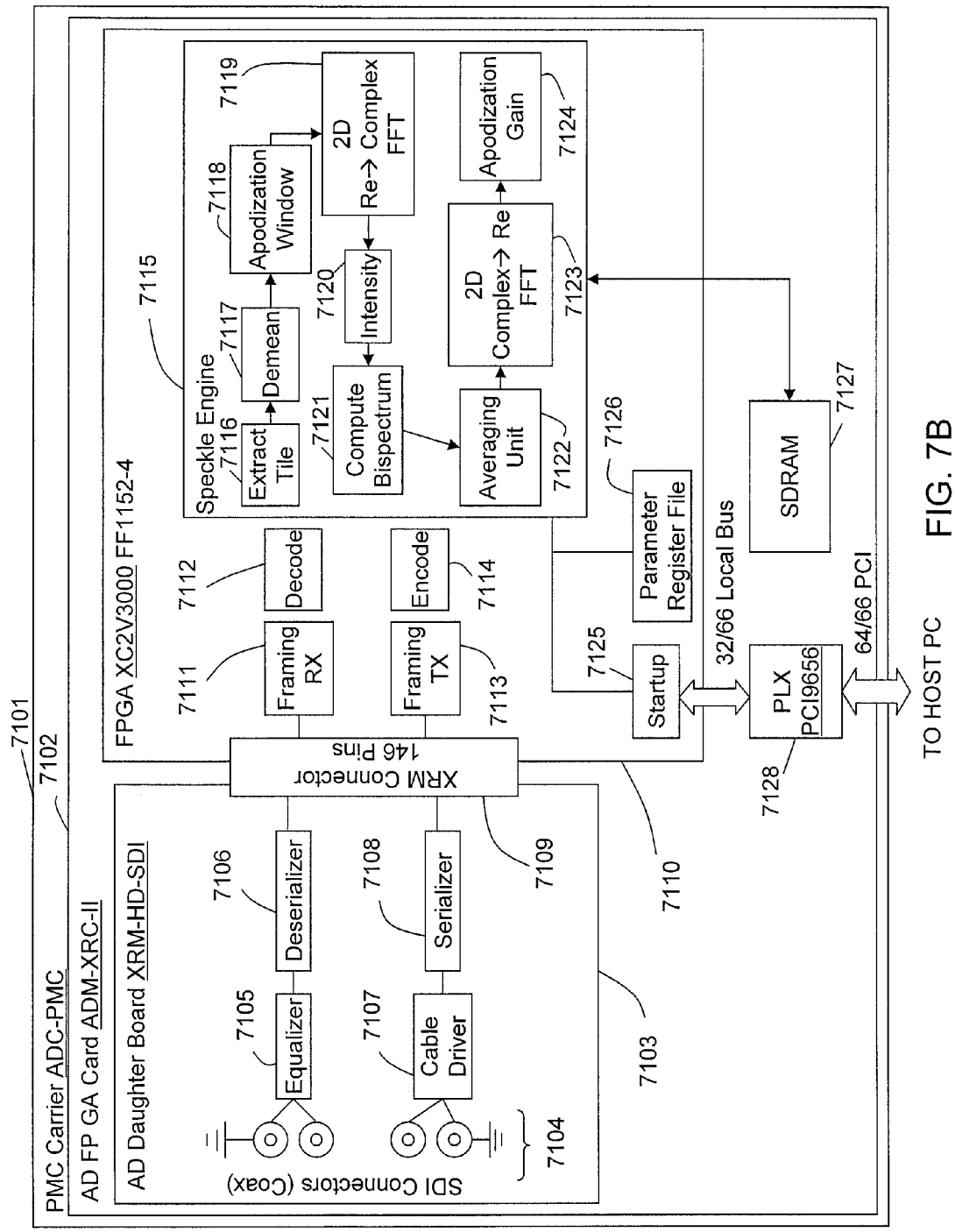
FIG. 7B is an exemplary detailed block diagram of the re-partitioned and accelerated Speckle Algorithm.

FIG. 7A and FIG. 7B are an exemplary circuit board layout and a detailed block diagram of a hardware system for the accelerated computation of the repartitioned Speckle algorithm, respectively. FIG. 7A shows an overview of an example of a circuit board layout 7002, that may be used in conjunction with a host PC 7001. Circuit board 7002 may contain a PCI bridge 7003, oscillator 7004, field-programmable gate array (FPGA) 7005, TX synthesizer 7006, transmitter 7007, and receiver 7008. In further detail, as shown in FIG. 7B, input/output video data to/from the system is provided through coaxial or other shielded connectors 7104, which may be part of a board 7103, which may further be part of another board 7102, which may be located, e.g., on a PMC carrier 7101. These inputs 7104 are connected to equalizer 7105 and cable driver 7107, respectively. The output of the equalizer 7105 and cable driver 7107 are connected to deserializer 7106 and serializer 7108, respectively. Outputs form the deserializer 7106 and serializer 7108 provide input signals for the framing receiver 7111 and framing transmitter 7113, respectively; these, and other components may be implemented on an FPGA 7110. The FPGA 7110 may be coupled to board 7103 via an XRM connector 7109, for example, and it may also be coupled to an SDRAM 7127. Outputs from the framing receiver 7111 and framing transmitter 7113 provide inputs to the decode 7112 and encoder 7114, respectively. A startup function 7125 and Parameter register file 7126 control the operation of a Speckle Engine hardware function 7115.

The Speckle Engine hardware function further comprises an extract tile function 7116 that is connected to a Demean function 7117 that provides inputs to an Apodization window 7118. The outputs of the Apodization window 7118 are connected to a two-dimensional (2-D) Real-Complex FFT 7119. The properties of the FFT 7119 include but are not limited to: real-number inputs in the range of 0 to 1 (inclusive); 2-D FFT sizes of at least 64×64, 256×256, 512×512 and 1024×1024; and wherein the inverse transforms take similar sizes but are range constrained at the output.

In addition, the outputs of the two-dimensional Real-Complex FFT 7119 provide inputs to an Intensity function 7120, whose outputs provide the data for a bispectrum computation function 7121. The outputs of the bispectrum computation function 7121 provide the inputs to an Averaging unit 7122. The outputs of the Averaging unit 7122 are connected to a two-dimensional Complex-Real FFT 7123. The outputs of the two-dimensional Real-Complex FFT 7123 are connected to an Apodization Gain unit 7124. The apparatus may further incorporate a PLX 7128 that may be coupled between the FPGA 7110 and a host PC (not shown).

Figure 8A:
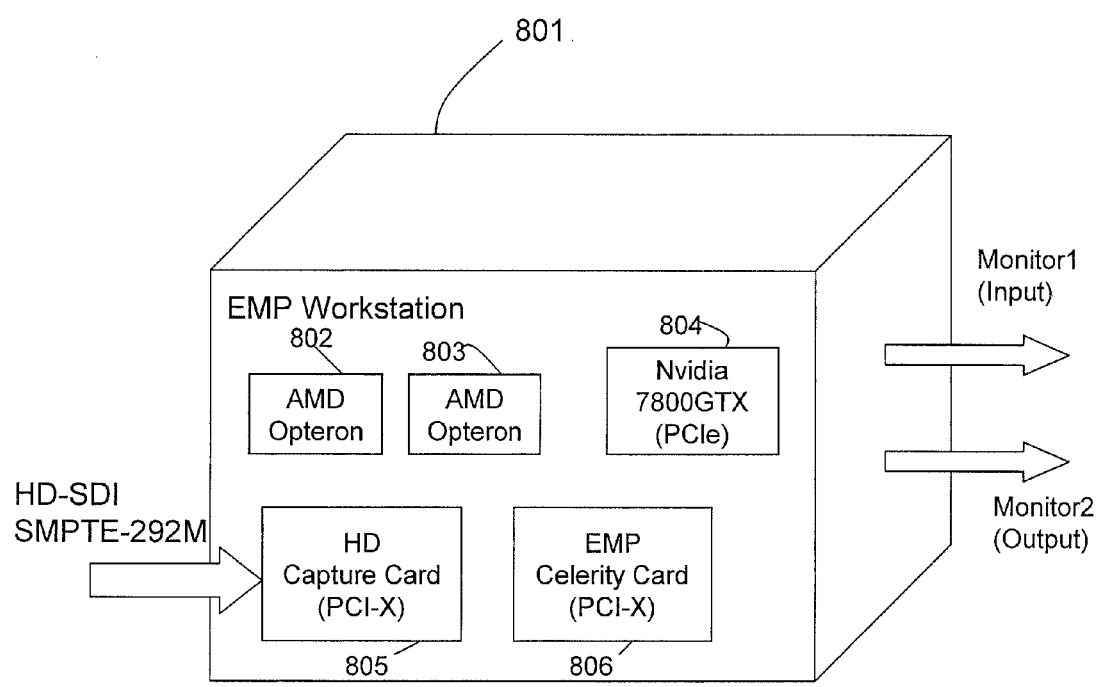
FIG. 8A shows a block diagram of an Accelerated Speckle Demonstration System.

Details of an exemplary implementation of the software and hardware systems discussed above and shown in the figures above and test results of the embodiments of the invention are discussed in the following paragraphs. In order to demonstrate and test embodiments of the invention, a physical framework capable of capturing a variety of video inputs and processing them using an FPGA was assembled. As shown in FIG. 8A, the system consists of a PC workstation 801 fitted with a 16 GB Celerity™ card FPGA 806 and advanced capture and display devices, such as the XenaLH high-definition capture card 805 from AJA system. In developing the prototype FPGA solver, we needed to build the computational components, state machines, and control logic to handle baseline processing functionality. The communication infrastructure required the appropriate memory controllers, host/solver communication channels, and access to the necessary I/O device. The prototype system of FIG. 8A was designed to meet, but is not limited to, the latest digital video standards used in high definition TV (HDTV): 720p resolution (1280×720 @ 60 frames per second). This imposes highly demanding constraints on the processing, much larger than any known background art speckle implementation, which typically use, but are not limited to sub-megapixel images (512×512 @24 or 30 frames per second) and cannot achieve realt-time throughput. Accordingly, the prototype system also included AMD Opteron™ components 802 and 803, as well as a video card 804 (in this example, an Nvidia™ 7800 GTX video card).

Figure 9:
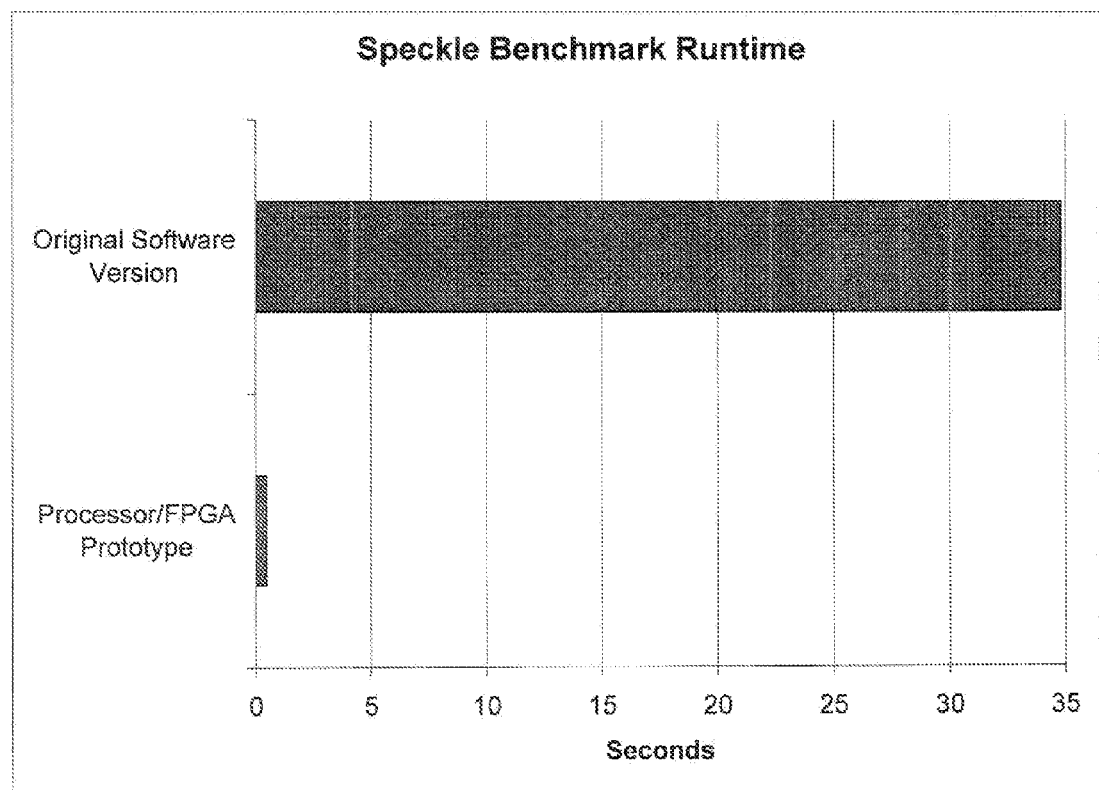
FIG. 9 shows a performance comparison between an original software version of the Speckle Algorithm and the re-partitioned and accelerated Speckle Demonstration System showing how the demonstration system outperformed the purely software approach by a factor 40×.

An overview of the parameters of an exemplary HD Card are shown in FIG. 8B. The High Definition (HD) Video Capture Card, as shown in FIG. 8A, supporting a wide range of video formats, provides versatility and will lead to further commercial applications of this project, and in other areas beyond speckle image processing. HD-SDI signals were provided as inputs into the prototype accelerated Speckle solver test system. After being captured by the HD card, they were passed to the host PC and Celerity™ FPGA board for Speckle algorithm processing. The "before" and "after" results are output on two monitors. The purely software approach required almost 35 seconds to generate a single frame of size 512 by 512 pixels. However, by utilizing embodiments of the invention, as described above, our hardware/software co-processor required less than 1 second. That is, as shown in FIG. 9, the demonstration and test hardware/software co-processing solution outperformed the purely software approach by a factor 40×. Further enhancement of the hardware solution is possible through additional, parallel computational pipelines to achieve an even greater speedup and thus enable real-time image enhancement.

Note that the exemplary prototype system described above represents just one, non-limiting example of many possible implementations and embodiments of the invention. For example, the system described above was implemented in a host PC. However, it is also possible to implement such accelerated processing within an embedded platform, consisting of an FPGA but no host PC. Additionally, the accelerated processing can be performed within a graphics processing unit (GPU), rather than an FPGA. Furthermore, other hardware processing platforms, such as the Cell processor, could utilize the invention described above to greatly enhance the performance of the speckle algorithm The foregoing description illustrates and describes embodiments of the invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A method for real-time computation of a Speckle algorithm incorporating a sliding window, comprising:
   initializing and setting up a plurality of memory locations;
   setting a frame counter to zero;
   inputting a present frame of a time sequenced image;
   computing a bispectrum of the present, frame;
   determining whether a computed bispectrum buffer is full with accumulated bispectrum computations and performing the following operations:
      when the computed bispectrum buffer is not full,
         setting a next oldest computed bispectrum frame to be an oldest computed bispectrum frame,
         adding the computed bispectrum of the present frame to the previous accumulated bispectrum frame computations and,
      if the computed bispectrum buffer is still not full,
   incrementing the frame counter and return to the step of inputting the present frame;
      and when the computed bispectrum buffer is full,
         subtracting the oldest computed bispectrum frame from the accumulated bispectrum frame computations,
         setting a next oldest computed bispectrum frame to be the oldest computed bispectrum frame,
         adding the computed bispectrum of the present frame to the previous accumulated bispectrum frame computations and,
      if the buffer is still not full,
   incrementing the frame counter and return to the step of inputting the present frame;
      and when the computed bispectrum buffer is full,
   normalizing the accumulated computed bispectrums;
   inverting the normalized accumulated bispectrums;
   outputting the normalized accumulated inverted bispectrums;
   incrementing the frame counter; and
   returning to the step of inputting the present frame.

2. A system for real-time computation of the method as recited in claim 1, the system comprising:
   a host computer;
   a PCI bridge;
   an oscillator;
   a transmitter synthesizer;
   a serializer;
   a receiver; and
   an FPGA,
   wherein at least one of the host computer or the FPGA, either alone or in combination, is configured for:
   said computing a bispectrum of the present frame; and
   said determining whether a computed bispectrum buffer is full with accumulated bispectrum computations and performing the following operations:
      when the computed bispectrum buffer is not full,
         setting a next oldest computed bispectrum frame to be an oldest computed bispectrum frame,
         adding the computed bispectrum of the present frame to the previous accumulated bispectrum frame computations' and,
      if the computed bispectrum buffer is still not full,
         incrementing the frame counter and returning to the step of inputting the present frame;
      and when the computed bispectrum buffer is full,
         subtracting the oldest computed bispectrum frame from the accumulated bispectrum frame computations, setting a next oldest computed bispectrum frame to be the oldest computed bispectrum frame, adding the computed bispectrum of the present frame to the previous accumulated bispectrum frame computations and, if the buffer is still not full, incrementing the frame counter and returning to the step of inputting the present frame;

and when the computed bispectrum buffer is full, normalizing the accumulated computed bispectrums;

inverting the normalized accumulated bispectrums;

outputting the normalized accumulated inverted bispectrums;

incrementing the frame counter; and returning to the step of inputting the present frame.

3. The system of claim 2, further comprising:

input and output shielded connectors configured to input and output video data;

an equalizer and cable driver connected to the input and output shielded connectors; and a deserializer, wherein the deserializer and serializer are connected to respective outputs of the equalizer and cable driver.

4. The system of claim 3, wherein the FPGA further comprises:

a framing receiver and framing transmitter connected to the outputs from the deserializer and serializer; and a decoder and encoder connected to the respective outputs from the framing receiver and framing transmitter; and an SDRAM and the PCI Bridge connected to the FPGA, wherein the deserializer is connected to the framing receiver and the serializer is connected to the framing transmitter.

5. The system of claim 4, wherein the FPGA comprises a Speckle engine and the Speckle engine further comprises:

a startup function and parameter register file configured to control system operation;

an extract tile function connected to a Demean function and configured to provide inputs to an Apodization window;

a first two-dimensional (2-D) Real-Complex Fast Fourier Transform (FFT) connected to the outputs of the Apodization window;

an Intensity function connected to the 2-D Real-Complex FFT;

a Compute Bispectrum function connected to outputs of the Intensity function;

an Averaging Unit connected to outputs of the Compute Bispectrum function;

a second two-dimensional (2-D) Real-Complex FFT connected to outputs of the Averaging Unit; and an Apodization Gain unit connected to outputs of the second two-dimensional (2-D) Real-Complex FFT, wherein the startup function is connected to the parameter register file, and the Speckle engine, the PCI bridge is connected to the startup function and the SDRAM is connected to the Speckle engine.

6. The system of claim 5, wherein at least one of the 2D-FFTs is configured to process real-number inputs in a range of at least 0 to 1, inclusive.

7. The system of claim 5, wherein the FFT sizes are at least 64×64, 256×256, 512×512 and 1024×1024.

8. The system of claim 5, wherein inverse FFT sizes are at least 64×64, 256×256, 512×512 and 1024×1024 and a range is constrained at the output.

9. A non-transitory machine-readable medium containing executable instructions that, when executed by a machine, cause the machine to implement a method for real-time computation of a Speckle algorithm incorporating a sliding window, comprising:

initializing and setting up a plurality of memory locations;

setting a frame counter to zero;

inputting a present frame of a time sequenced image;

computing a bispectrum of the present frame;

determining whether a computed bispectrum buffer is full with accumulated bispectrum computations and performing the following operations:

when the computed bispectrum buffer is not full, setting a next oldest computed bispectrum frame to be an oldest computed bispectrum frame, adding the computed bispectrum of the present frame to the previous accumulated bispectrum frame computations and, if the computed bispectrum buffer is still not full, incrementing the frame counter and return to the step of inputting the present frame;

and when the computed bispectrum buffer is full, subtracting the oldest computed bispectrum frame from the accumulated bispectrum frame computations, setting a next oldest computed bispectrum frame to be the oldest computed bispectrum frame, adding the computed bispectrum of the present frame to the previous accumulated bispectrum frame computations and, if the buffer is still not full, incrementing the frame counter and return to the step of inputting the present frame;

and when the computed bispectrum buffer is full, normalizing the accumulated computed bispectrums;

inverting the normalized accumulated bispectrums;

outputting the normalized accumulated inverted bispectrums;

incrementing the frame counter and returning to the step of inputting the present frame.

\* \* \* \* \*